(12) United States Patent
Tolley et al.

(10) Patent No.: US 11,473,467 B2
(45) Date of Patent: Oct. 18, 2022

(54) SYSTEM FOR WORKING MACHINE

(71) Applicant: J.C. BAMFORD EXCAVATORS LIMITED, Uttoxeter (GB)

(72) Inventors: Alan Tolley, Uttoxeter (GB); Giles Smith, Uttoxeter (GB)

(73) Assignee: J.C. BAMFORD EXCAVATORS LIMITED, Uttoxeter (GB)

( * ) Notice: Subject to any disclaimer, the term of this patent is extended or adjusted under 35 U.S.C. 154(b) by 0 days.

(21) Appl. No.: 16/940,382

(22) Filed: Jul. 27, 2020

(65) Prior Publication Data
US 2022/0025797 A1     Jan. 27, 2022

(30) Foreign Application Priority Data

Jul. 26, 2019   (GB) .................................. 1910753.1

(51) Int. Cl.
*F01N 3/20*   (2006.01)
*F01N 3/38*   (2006.01)

(52) U.S. Cl.
CPC ......... *F01N 3/2033* (2013.01); *F01N 3/2013* (2013.01); *F01N 3/208* (2013.01); *F01N 3/38* (2013.01); *F01N 2240/16* (2013.01); *F01N 2250/04* (2013.01); *F01N 2430/04* (2013.01); *F01N 2560/06* (2013.01); *F01N 2590/08* (2013.01); *F01N 2610/02* (2013.01); *F01N 2610/146* (2013.01); *F01N 2900/1602* (2013.01)

(58) Field of Classification Search
CPC .............................. F01N 3/2013; F01N 3/2033
See application file for complete search history.

(56) References Cited

U.S. PATENT DOCUMENTS 5,390,488 A    2/1995 Ament et al.
5,428,955 A    7/1995 Yuuki et al.
(Continued)

FOREIGN PATENT DOCUMENTS

EP    2 806 127 A1    11/2014
EP    3406871 A1    11/2018
(Continued)

OTHER PUBLICATIONS

Search Report for GB 1820068.3, dated May 31, 2019.
(Continued)

*Primary Examiner* — Jonathan R Matthias
(74) *Attorney, Agent, or Firm* — Marshall, Gerstein & Borun LLP

(57) ABSTRACT

An emissions abatement system for an engine system having an engine and an after-treatment system is provided. The emissions abatement system is configured for operation in an off-highway vehicle and comprises a controller arranged to: receive an input indicative of an intent to start the vehicle; upon receipt of said input, activate a heating component to raise an operating temperature of at least a portion of the after-treatment system; determine when the after-treatment system has reached a first heated condition; once the first heated condition has been reached, direct the engine to be started and direct the vehicle to operate in a first mode; determine when the after-treatment system has reached a second heated condition; and once the second heated condition has been reached, direct the vehicle to operate in a second mode.

17 Claims, 7 Drawing Sheets

(56) References Cited

U.S. PATENT DOCUMENTS

| | | |
|---|---|---|
| 2008/0223019 A1 | 9/2008 | Gonze et al. |
| 2008/0275600 A1 | 11/2008 | Rask et al. |
| 2008/0295493 A1 | 12/2008 | Applegate et al. |
| 2009/0183496 A1 | 7/2009 | Arakawa et al. |
| 2010/0276223 A1 | 11/2010 | Gonze |
| 2010/0280698 A1 | 11/2010 | Ichikawa |
| 2012/0255279 A1 | 10/2012 | Atluri et al. |
| 2013/0213010 A1 | 8/2013 | Zhang et al. |
| 2013/0276434 A1 | 10/2013 | Andersson et al. |
| 2016/0311304 A1 | 10/2016 | Niwa |
| 2017/0234285 A1 | 8/2017 | Huh et al. |
| 2017/0320483 A1 | 11/2017 | Ishihara et al. |
| 2018/0291784 A1 | 10/2018 | Achenback et al. |
| 2019/0276004 A1 | 9/2019 | Takasu et al. |
| 2019/0308490 A1 | 10/2019 | Obuchi |
| 2020/0263591 A1 * | 8/2020 | Matsumura ............. F02D 45/00 |

FOREIGN PATENT DOCUMENTS

| | | | |
|---|---|---|---|
| EP | 3476680 | A1 | 5/2019 |
| FR | 2878899 | A1 | 6/2006 |
| JP | H09125939 | A | 5/1997 |
| JP | H10169433 | A | 6/1998 |
| JP | 2010236544 | A * | 10/2010 |
| WO | WO-2010/050857 | A1 | 5/2010 |

OTHER PUBLICATIONS

Search Report for GB 1910753.1, dated Jan. 21, 2020.
Search Report for GB1820068.3, dated May 30, 2019.
Extended European Search Report for EP 19214461.6, dated Feb. 14, 2020.
Further Search Report for GB 19190753.1, dated Jul. 14, 2020.
Extended European Search Report for EP 20187712.3—, dated Oct. 21, 2020.

* cited by examiner

SYSTEM FOR WORKING MACHINE

FIELD

The present disclosure relates to an emissions abatement system for an engine system having an after-treatment system. In addition, the present disclosure relates to an off-highway vehicle including such an emissions abatement system.

BACKGROUND

Off-highway vehicles use, almost exclusively, internal combustion engines to provide the energy and power required for operation. Whilst these engines can be efficient and cost effective they emit exhaust pollutants (hydrocarbons, nitrogen oxides and particulate matter), which can be detrimental to health and to the environment.

Various abatement technologies are known for engines, e.g. diesel engines, which may be used alone or in combinations, to reduce these harmful emissions. These technologies include the following:

Diesel particulate filters (DPF) are provided to remove particulate matter from engine exhausts. As the particulate matter may accumulate in the filter causing blockages, mechanisms are required to clean the filter. Passive filters use a catalyst to remove accumulations, but need high temperatures to work. This cannot be guaranteed for off-highway applications, because the engine may spend a significant time idling, such that sufficient temperatures may not be achieved passively. An "active" DPF is therefore desirable for the technology to be effective in off-highway applications. Active DPFs periodically burn fuel, either in a fuel burner, or by using the engine management system to increase exhaust temperature by changing the fuel injection strategy to heat the filter to particulate matter combustion temperatures. High reductions in particulate matter are achievable (over 99% in optimal conditions). Disadvantages of active DPFs include an increased specific fuel consumption.

Selective catalytic reduction (SCR) combines the use of a catalyst such as vanadium, tungsten, copper zeolite (Cu-Zeolite), or iron zeolite (Fe-Zeolite) with a reductant such as anhydrous ammonia, aqueous ammonia, or more typically, urea, to convert NO and $NO_2$ to nitrogen and water. Urea is typically used as the reductant, but has to be injected into the exhaust somewhat upstream of the SCR catalyst in order to thermally decompose into ammonia by the point at which it enters the SCR catalyst. Urea is preferred over ammonia, as it substantially safer to store and transport. In the USA, commercially available urea for use with SCRs is referred to as Diesel Exhaust Fluid (DEF), whereas in Europe it is referred to as "AdBlue®". For SCRs to function effectively at the lower end of the temperature spectrum it has hitherto been desirable for there to be a 50:50 split of NO and $NO_2$, although Cu-Zeolite catalysts have been found to improve performance at temperatures of less than 300° C. when there is little $NO_2$ available. An advantage of SCR is that it has minimal impact of specific fuel consumption. On the downside, there is a risk that excess injection of urea reductant, or that ammonia resident in the SCR catalyst at lower temperatures and released as the catalyst heats, causes unreacted ammonia to be emitted from the SCR into the atmosphere. This is referred to in the industry as "ammonia slip".

Diesel Oxidation Catalysts (DOC) are provided to promote chemical oxidation of carbon monoxide and unburnt hydrocarbons in the exhaust of diesel engines, to form carbon dioxide and water. Another function of DOCs is to promote oxidation of nitric oxide to form nitrogen dioxide, to support SCR activity downstream. DOCs typically comprise a substrate material coated with a suitable catalyst material (e.g. comprising platinum group metals).

Such emissions control devices can be very effective at removing emissions (in excess of 99%), but require optimal operating conditions to be effective.

Accordingly, the present disclosure seeks to overcome, or at least mitigate the problems of the prior art.

SUMMARY

In a first aspect, an emissions abatement system is provided for an engine system having an engine and an after-treatment system, the emissions abatement system being configured for operation in an off-highway vehicle and comprising a controller arranged to:
  receive an input indicative of an intent to start the vehicle,
  upon receipt of said input, activate a heating component to raise an operating temperature of at least a portion of the after-treatment system,
  determine when the after-treatment system has reached a first heated condition,
  once the first heated condition has been reached, direct the engine to be started and direct the vehicle to operate in a first mode;
  determine when the after-treatment system has reached a second heated condition, and
  once the second heated condition has been reached, direct the vehicle to operate in a second mode.

In other words, prior to starting a vehicle, at least a portion of the after-treatment system is heated. Consequently, the after-treatment system is heated to a first heated condition. For example, in the first heated condition, a portion of the after-treatment system may be at or above an effective temperature. The effective temperature may be the temperature at which a catalyst of the after-treatment system begins to function with a required level of efficiency, which may depend on various factors, e.g. whether the vehicle is starting from a cold or warm start, the ambient temperature.

When the first heated condition has been reached, the engine is started and the vehicle is operable in a first mode. As will be explained in further detail below, the first mode may comprise a restricted mode of operation in which the available operations of the vehicle are limited.

Once the engine has been started, exhaust gases from the engine will heat the after-treatment system and, after a given amount of time, the after-treatment system will reach a second heated condition. In exemplary embodiments, in the second heated condition, the entire after-treatment system is at or above the effective temperature. Once the second heated condition has been reached, the vehicle is operable in a second mode. As will be explained in further detail below, the vehicle may be fully operational in the second mode.

By way of example, in the first heated condition, a portion of the after-treatment system is heated to an effective temperature. When the engine is running and the vehicle operated in the first mode, this heated portion is sufficient to remove or reduce harmful emissions from the engine exhaust gases. Since the operation of the vehicle is limited in the first mode, engine emissions can be maintained below an amount which can be effectively treated by the after-treatment system. Accordingly, minimal or no emissions are produced. In some embodiments, effectively no emissions are produced.

Continuing with this example, when the engine is running, exhaust gases from the engine provide heat to the after-treatment system, further raising the operating temperature to a second heated condition. Using the engine to heat the after-treatment system is an energy efficient heating means, since chemical energy is being converted directly into heat energy.

In this way, an energy efficient way of heating the after-treatment system is provided, whilst ensuring that minimal or no emissions are produced from the vehicle.

In exemplary embodiments, the engine is an internal combustion engine.

In exemplary embodiments, the engine is a diesel engine and/or the engine system is a diesel engine system.

After-treatment systems, such as SCR systems can achieve up to 99.9% efficiency under specific conditions, for example, under specific temperature conditions. For example, when an SCR arrangement is cold, $NO_x$ emissions may be high e.g. at about 500 ppm. Whereas, in the case of a Cu-Zeolite catalyst, when the SCR reaches a temperature of about 300° C., $NO_x$ emissions are reduced to approximately zero, e.g. effectively zero. Accordingly, by heating the after-treatment arrangement, greatly reduced $NO_x$ emissions are achieved. The performance of an SCR is highly dependent on temperature.

Further, DOCs are temperature dependent. DOCs promote the chemical oxidation of CO and hydrocarbons, and also increase the level of $NO_2$ in the exhaust gases, which is required to support the function of the SCR catalyst. Typically DOCs have an optimum temperature for high oxidation efficiency.

Therefore, by heating the after-treatment arrangement prior to engine start-up, reduced or negligible emissions are achievable, right from the point of engine start-up. Further, by using the engine to heat the after-treatment system after the first heated condition has been reached, more energy efficient heating of the after-treatment system is achievable.

Emissions abatement systems disclosed herein enable the engine to start with a fully functioning after-treatment system. Further, typically a lot of the emissions an engine generates are generated during the start-up process. Accordingly by heating the after-treatment system to an effective condition prior to start-up, the engine system can be run in the most efficient emissions strategy and have significantly lower overall engine emissions than would typically be expected during a normal cold start.

The input indicative of an intent to start the vehicle may be a user input, for example, the input may correspond to a user turning a key in the engine, a user opening a door to an operator cab, and/or a user occupying an operator seat in the operator cab.

Further, emissions at the point of use are sufficiently low as to be insignificant and classified as "zero", enabling use of engine systems in "Zero Emission Zones".

Optionally, in the first mode, the vehicle is controlled to maintain the load on the engine below a predetermined load threshold.

In exemplary embodiments, in the first mode, operation of the vehicle is inhibited or prevented entirely. In other words, the engine is running but operation of the vehicle is prevented or the available operations are limited.

In exemplary embodiments, movement/actuation of the vehicle is prevented in the first mode. In some embodiments, only lighting, heating and/or other peripheral operations are available when the vehicle is operating in the first mode.

The vehicle may be controlled by controlling the operations available so that only those which place a low load demand on the engine are permitted, wherein the low load demand is such that the corresponding amount of engine emissions produced can be treated by the after-treatment system, so that minimal or no harmful emissions are released. Additionally or alternatively, the vehicle may be controlled by restricting the vehicle to operate at low speed only, which would inherently limit the load generated by the operations carried out.

Optionally, in the second mode, vehicle operations are not controlled to maintain the load on the engine below the predetermined load threshold.

In other words, the vehicle may be fully operational, i.e. the available operations are not limited.

In exemplary embodiments, when the after-treatment system has reached the second heated condition, the after-treatment system can effectively treat engine emissions without restricting the operation of the vehicle. Accordingly, low or negligible emissions are produced.

Optionally, the predetermined load threshold is gradually increased as the after-treatment system progresses from the first heated condition to the second heated condition.

In exemplary embodiments, as the after-treatment system progresses from the first heated condition to the second heated condition, the controller controls the system such that the load which can be placed on the engine increases. Consequently, the restrictions on the vehicle operations will become progressively less as the engine progresses from the first heated condition to the second heated condition.

Optionally, in the first heated condition, a first predetermined portion of the after-treatment system is at or above a first predetermined temperature and a second predetermined portion of the after-treatment system is below a second predetermined temperature.

The first and/or second predetermined temperature may be an effective temperature at which a respective catalyst of the after-treatment system begins to function with a required level of efficiency. The effective temperature may depend on various factors, e.g. whether the vehicle is starting from a cold or warm start, and the ambient temperature.

The required level of efficiency may correspond to a temperature lower than the optimal temperature, for example, to improve heating efficiency. For example, heating the after-treatment system directly via the engine exhaust gases may be more energy efficient than heating via a separate heating component. Therefore, the predetermined temperature may be selected to account for this.

Optionally, in the second heated condition, the first predetermined portion is at or above the first predetermined temperature and the second predetermined portion is at or above the second predetermined temperature.

In exemplary embodiments, the second heated condition is reached when the entirety of the after-treatment system is at or above an effective temperature.

Optionally, the first predetermined temperature is an effective temperature of the first predetermined portion and/or the second predetermined temperature is an effective temperature of the second predetermined portion.

Optionally, the first and second predetermined temperatures are the same temperature.

In exemplary embodiments, the effective temperature of the first predetermined portion is different from the effective temperature of the second predetermined portion.

Optionally, the controller is configured such that, when the controller determines that the after-treatment system is in the first heated condition, the controller directs the heating component to raise the operating temperature of the after-treatment system.

In this case, the system continues to heat the after-treatment system after the first heated condition has been reached. This, together with heating directly from the engine exhaust gases, raises the operating temperature of the after-treatment system more quickly. In this way, the time taken for the vehicle to be fully operable is minimised, whilst heating efficiently and still enabling harmful emissions to be reduced or entirely removed.

Optionally, the controller is configured to determine when the after-treatment system is in a cold condition, in which both the first and second predetermined portions are below the respective predetermined temperatures, and the controller is further configured such that, when the controller determines that the after-treatment system is in a cold condition, the controller directs the heating component to apply a first amount of energy to raise the operating temperature of the after-treatment system, and when the controller determines that the after-treatment system is in the first heated condition, the controller directs the heating component to apply a second (e.g. reduced) amount of energy to raise the operating temperature of the after-treatment system.

In exemplary embodiments, heating of the after-treatment system directly from the engine exhaust gases is more energy efficient. Therefore, reducing the energy provided to the heating component between the first and second heated conditions facilitates more energy efficient heating.

Optionally, the controller is configured such that, when the controller determines that the after-treatment system is in the first heated condition, the controller directs the heating component to stop heating the after-treatment system.

Optionally, the controller is configured such that, when controller determines that the after-treatment system is in the second heated condition, the controller directs the heating component to stop heating the after-treatment system.

In such embodiments, heating directly from the engine exhaust gases will typically maintain the temperature of the after-treatment system.

Optionally, the first predetermined portion is upstream of the second predetermined portion.

Accordingly, heat generated by chemical processes at the first predetermined portion will pass downstream to heat the second predetermined portion of the after-treatment component.

Optionally, the first and second predetermined portions are thermally isolated.

In this way, when heating the first predetermined portion, the amount of heat energy lost to the second predetermined portion is reduced. Consequently, less energy is required to heat the first predetermined portion.

In exemplary embodiments, the first and second predetermined portions are thermally isolated by an air gap. An emissions abatement system according to claim 13 or 14, wherein the after-treatment system includes one or more after-treatment components.

In exemplary embodiments, the after-treatment system may include an SCR component and/or a DOC component.

Optionally, the first predetermined portion is provided by a first after-treatment component and a second predetermined portion is provided by a second after-treatment component.

Optionally, the first predetermined portion comprises an upstream portion of an after-treatment component, and the second portion comprises the remainder of the same after-treatment component.

Optionally, the after-treatment system comprises a plurality of after-treatment components, each of which comprising a first predetermined portion, comprising an upstream portion of the after-treatment component, and a second predetermined portion, comprising the remainder of the same after-treatment component.

Heating up the smaller predetermined portions of the after-treatment components enables the vehicle to be operable at idle or low loads and under high levels of conversion efficiency whilst the remainder of the respective component is still warming. In the case of a DOC component, exothermic reactions will occur at the predetermined portion and so will further aid in heating the remainder of the component/after-treatment system.

Optionally, the heating component comprises a heating element configured to heat the first predetermined portion (s).

Optionally the or each after-treatment component comprises a substrate coated with catalytic material, wherein the first predetermined portion comprises an upstream portion of the substrate and the second predetermined portion comprises the remainder of the substrate.

Optionally, the upstream portion of the substrate (i.e. the first predetermined portion) comprises the heating element.

There are a number of ways that the catalyst can be applied to the substrate (including the heated portion), as will be appreciated by those skilled in the art. For example, the catalyst may be applied directly to a heating element.

In exemplary embodiments, the heated portion of the substrate comprises in the range of 5-35% of the substrate length.

Optionally, the after-treatment system comprises a DOC component upstream of an SCR component.

Optionally the after-treatment system comprises an injector for injecting a fluid into an exhaust, wherein the composition of the fluid and location of the injector is such that a reductant (e.g. ammonia) is provided to the SCR component, wherein the controller is configured to receive an input indicative of an intent to stop the vehicle, and wherein the controller is configured such that, upon receipt of said input and prior to engine shutdown, the controller directs the injector to inject the fluid into the exhaust such that the heated portion of the SCR is coated with the fluid.

This avoids any cooling effect of injecting the fluid during the warm-up phase. Such a fluid may be diesel emission fluid (DEF).

Optionally the heating component (additionally or alternatively) comprises a combustor arranged such that exhaust gases from the combustor provide heat energy to the after-treatment system.

In exemplary embodiments, exhaust gases from the combustor directly heat the after-treatment system.

In a further aspect, an emissions abatement system is provided for an engine system having an engine and an after-treatment system, the emissions abatement system being configured for operation in an off-highway vehicle and comprising a controller arranged to:

receive an input indicative of an intent to start a vehicle, upon receipt of said input activate a heating component to raise an operating temperature of at least a portion of the after-treatment system, determine when a temperature of at least a portion of the after-treatment system has reached a threshold temperature, once the threshold temperature has been reached, directing the engine be started;

wherein the heating component comprises a combustor arranged such that exhaust gases from the combustor provide heat energy to raise the temperature of the after-treatment system.

In this way, the operating temperature of at least a portion of the after-treatment system can be increased to, or nearer to, an effective temperature, prior to start-up of the engine. Consequently, the after-treatment system is primed to more effectively remove emissions and particulate matter from the engine exhaust gases than would typically be achievable when starting the engine from cold. This has the advantage of reducing harmful emissions from the engine system (e.g. $NO_x$ and particulate matter).

Exhaust gases from the combustor are used to heat the after-treatment system.

In some known vehicles, a combustor may already present, for example to heat the operator cab. Adapting the combustor already present on the vehicle to carry out this additional functionality eliminates the need for additional components to be introduced and maximises the utilisation of the components already present. This has beneficial implications for the cost and weight of the vehicle.

In some known vehicles, a diesel fired heater is present to heat the engine and operator cab. In such cases, this can be replaced with a combustor, e.g. a catalytic combustor. Consequently, the overall number of components on the vehicle remains the same. This has beneficial implications for the cost and weight of the vehicle.

Hot waste gas from the combustor is used to pre-heat the after-treatment system before the engine starts. The combustor may then continue running after the engine has started, for example to speed up warm-up of the after-treatment system, or to supply heat to other components of the vehicle.

The combustor may also be used during low load conditions to ensure that the after-treatment system temperature is maintained.

In exemplary embodiments, the combustor is selected to have very low emissions.

The threshold temperature may be an effective temperature at which a catalyst at the portion of the after-treatment system begins to function with a required level of efficiency. The effective temperature may depend on various factors, e.g. whether the vehicle is starting from a cold or warm start, and the ambient temperature.

The required level of efficiency may correspond to a temperature lower than the optimal temperature, for example, to improve heating efficiency. For example, heating the after-treatment system directly via the engine exhaust gases may be more energy efficient than heating via a combustor. Therefore, the threshold temperature may be selected to account for this.

Optionally, the combustor exhaust is provided in-line with an engine exhaust and upstream of the after-treatment system, or the combustor exhaust is coupled to the engine exhaust upstream of the after-treatment system.

Optionally, the combustor is a catalytic combustor.

Catalytic combustors typically have extremely low emissions and so the catalytic combustor can increase the operating temperature of the after-treatment system, whilst providing very low levels of emissions itself.

In exemplary embodiments, catalytic combustors such as those described in WO2007/0035649 and US2014/0186784 may be used.

Optionally, activation of the catalytic combustor comprises:
heating a catalyst of the catalytic combustor, and
once the catalyst reaches a predetermined temperature (e.g. effective temperature), begin combustion in the catalytic combustor.

By heating the catalyst of the catalytic combustor prior to combustion being started, the emissions from the combustion and hence from the catalytic combustor can be minimised. This contributes to the low or negligible overall emissions of the system.

Optionally, the combustor is configured to heat at least one other component of the vehicle, e.g. an operator cab and/or the engine.

In this way, the combustor can carry out a plurality of functions. For example, heating and maintaining the temperature of the engine and/or after-treatment system, and/or heating the operator cab. This reduces the need for additional components and so saves both cost and weight.

Optionally, the combustor comprises a heat transfer medium, e.g. water jacket, to direct heat generated by the combustor to the at least one other component.

Optionally, the controller is configured to selectively direct heat generated by the combustor to the after-treatment system and/or one or more of the at least one other component.

Accordingly, heat generated by the combustor can be distributed around the vehicle as required, depending on the operational status of the vehicle. For example at start up, heat can be directed primarily to the after-treatment system. Once the after-treatment system is up to temperature, the heat generated can be re-directed to another component e.g. to heat the operator cab.

Optionally, the engine system comprises an electrical energy storage device (e.g. a battery) for starting the engine, wherein activating the heating component comprises the controller directing the electrical energy storage device to provide electrical energy to the heating component.

In other words, the same electrical energy storage device that is already present in the engine system for starting the engine, can be used to provide electrical energy to the heating component. No additional electric energy storage devices, e.g. lithium ion batteries, are required.

Alternatively, the engine system may be a hybrid system comprising an engine and electrical energy storage device for powering the vehicle. In such embodiments, the controller may be configured to direct the electrical energy storage device (for powering the vehicle) to provide electrical energy to the heating component. For example, the emissions abatement systems disclosed herein may be applied to engine systems and off-highway vehicles such as those described in UK patent application number GB 1820068.3.

Optionally the controller is configured such that, when the vehicle is operating under low load conditions (e.g. 10-20% of engine maximum exhaust mass flow), the controller directs the heating component to raise the operating temperature of the after-treatment system.

When the vehicle is carrying out relatively low load operations, the demand on the engine is correspondingly low, which can result in a reduction in the temperature of exhaust gases produced by the engine. Consequently, the operating temperature of the after-treatment system may drop. By controlling the heating component to raise the operating temperature of the after-treatment system in low load conditions, effective reduction in the release of harmful emissions from the engine system can be maintained.

In a further aspect, an emissions abatement system is provided for an engine system having an engine and an after-treatment system, the emissions abatement system being configured for operation in an off-highway vehicle and comprising a combustor arranged such that, in use, exhaust gases from the combustor directly heat the after-treatment system.

In this way, efficient heating of the after-treatment system can be achieved.

Optionally, the combustor is a catalytic combustor.

Optionally, the combustor exhaust is provided in-line with an engine exhaust and upstream of the after-treatment system, or the combustor exhaust is coupled to the engine exhaust upstream of the after-treatment system.

Optionally, the combustor is configured to heat at least one other component of the vehicle, e.g. an operator cab and/or the engine.

Optionally, the combustor comprises a heat transfer medium, e.g. water jacket, to direct heat generated by the combustor to the at least one other component.

In a further aspect, an off-highway vehicle comprising an emissions abatement system disclosed herein is provided.

BRIEF DESCRIPTION OF THE DRAWINGS

Embodiments disclosed herein will now be described, by way of example only, with reference to the accompanying drawings, in which.

DETAILED DESCRIPTION

Figure 1:
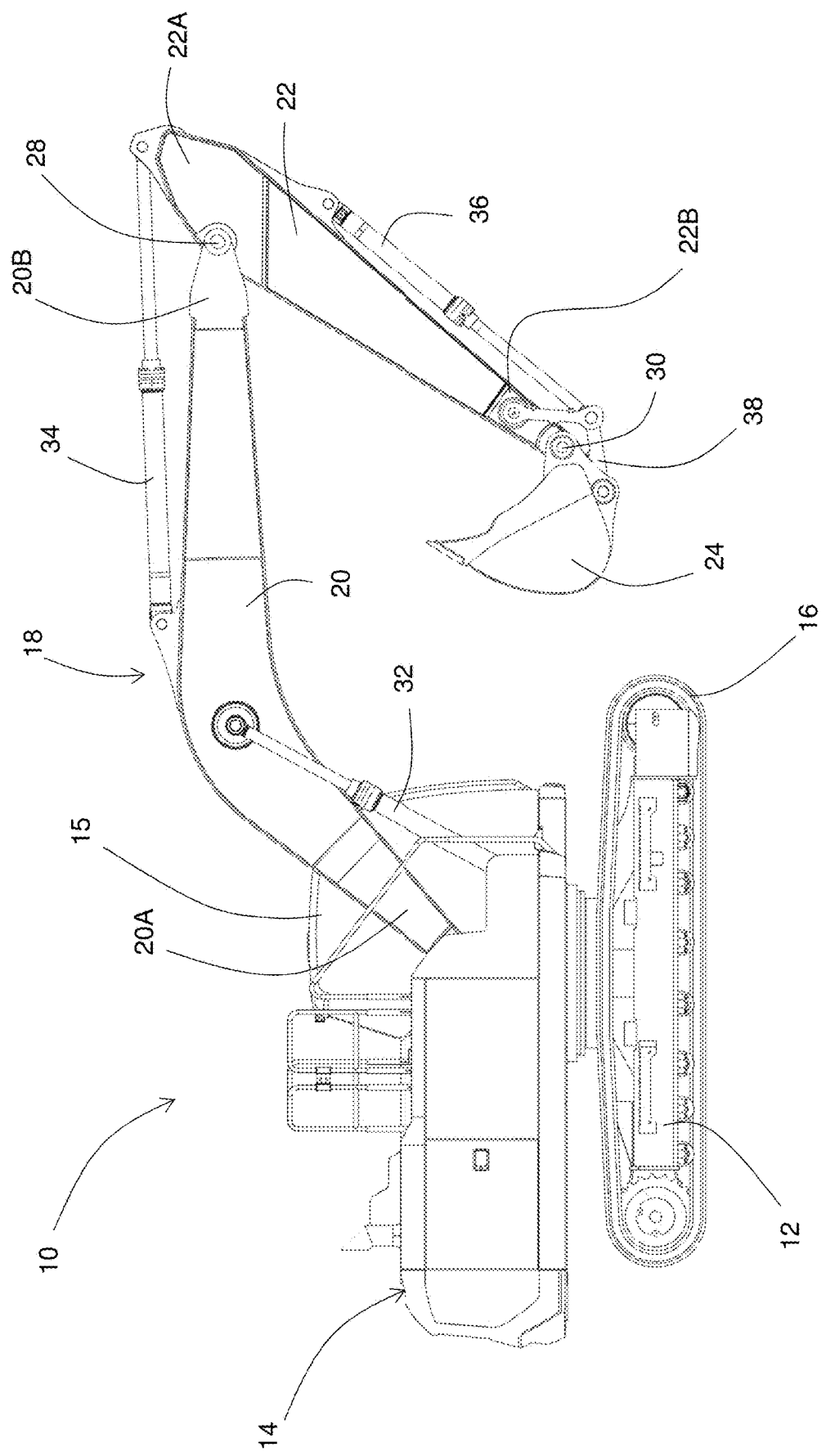
FIG. 1 illustrates an off-highway vehicle in accordance with an embodiment of the disclosure.

With reference to FIG. 1 there is shown an off-highway vehicle 10, e.g. an excavator, including a chassis 12 and a superstructure 14 carrying an operator cab 15 from which an operator can control the vehicle 10. The superstructure 14 is mounted on the chassis 12. Ground engaging transport means in the form of a pair of tracks 16 are provided on the chassis 12 to move the machine over the ground.

Off-highway vehicles are for example those used in construction industries (e.g. backhoe loaders, slew excavators, telescopic handlers, forklifts, skid-steer loaders, dump trucks, bulldozers, graders), agricultural industries (tractors, combine harvesters, self-propelled harvesters and sprayers), quarrying (e.g. loading shovels, aggregate crushing equipment), and forestry (timber harvesters, feller bunchers).

Attached to the vehicle superstructure 14 is an arm assembly 18, the arm assembly includes a first arm in the form of a boom 20, a second arm in the form of a dipper 22 and a ground engaging implement in the form of a bucket 24. The boom 20 is pivotally mounted to the frame 14 at a first end 20A by a pivot (not shown). The dipper 22 is pivotally mounted via pivot 28 to a second end 20B of the boom 20. Pivot 28 is orientated horizontally. The bucket is pivotally mounted via pivot 30 to an end 22B of dipper 22 remote from end 22A of dipper 22. Pivot 30 is orientated horizontally.

A first hydraulic actuator in the form of a first hydraulic ram 32 has a first end pivotally attached to the superstructure 14 and a second end pivotally attached to the boom 20 part way between the first and second ends of the boom. A second hydraulic actuator in the form of a second hydraulic ram 34 has a first end pivotally attached to the boom 20 part way between the first and second ends of the boom and a second end pivotally attached to the dipper 22 proximate the first end of the dipper. A third hydraulic actuator in the form of a third hydraulic ram 36 has a first end pivotally attached to the dipper 22 proximate the first end of the dipper 22 and a second end pivotally attached to a linkage mechanism 38 proximate the second end of the dipper. The linkage mechanism 38 per se is known and simply converts extension and retraction movement of the third hydraulic ram 36 into rotary movement of the bucket 24 about pivot 30.

Extension of the first hydraulic ram 32 causes the boom 20 to raise, and contraction of the first hydraulic ram 32 causes lowering of the boom 20. Extension of the second ram 34 causes the dipper 22 to pivot in a clockwise direction (when viewing FIG. 1) about pivot 28, i.e. causes the boom to move in a "dipper in" direction, and retraction of the second hydraulic ram 34 causes the dipper 22 to move in an anticlockwise direction when viewing FIG. 1 about pivot 28, i.e. in a "dipper out" direction. Extension of the third hydraulic ram 36 causes the bucket 24 to move in a clockwise direction about pivot 30, i.e. in a "crowd" direction, and retraction of the third hydraulic ram 36 causes the bucket to move in an anticlockwise direction about pivot 30, i.e. in a "dump" direction.

Figure 2:
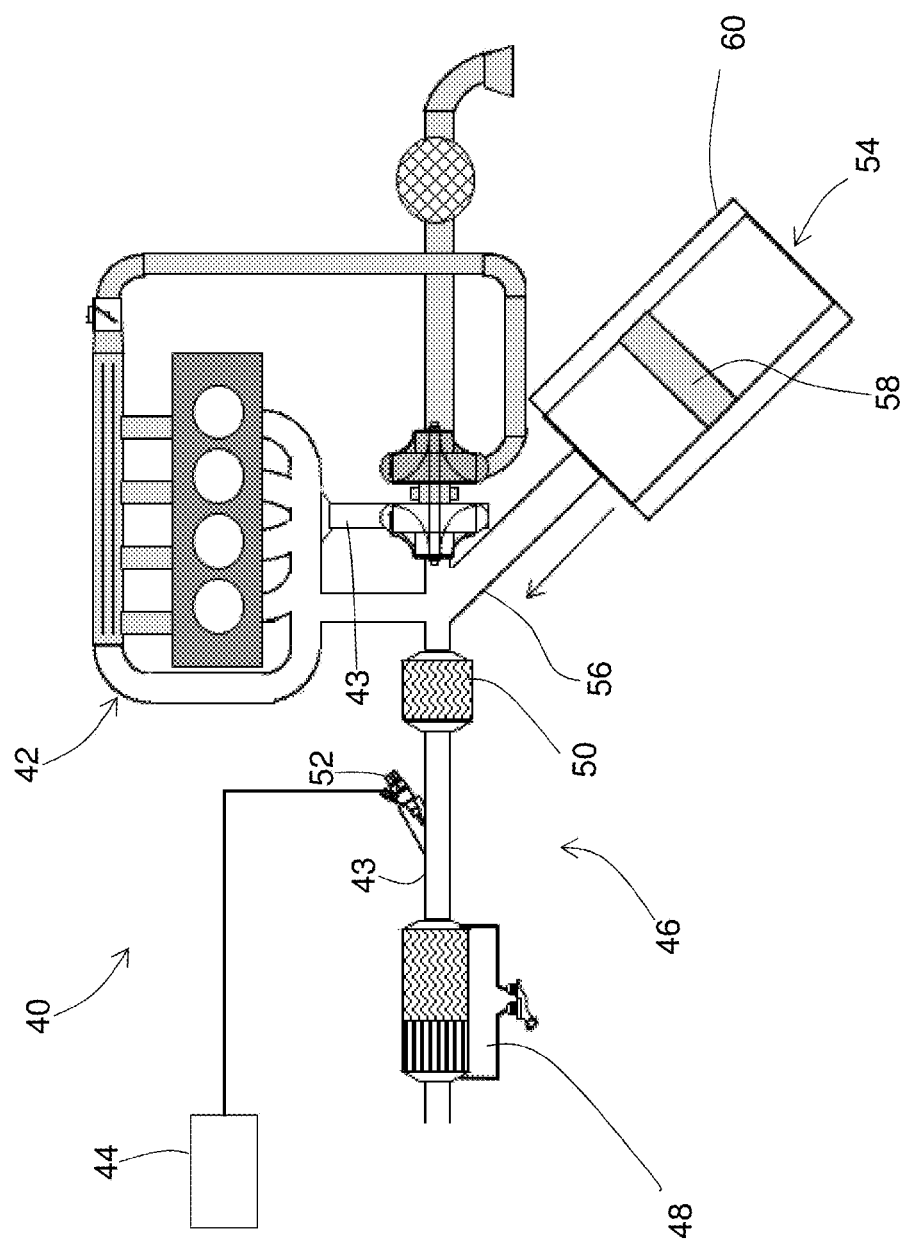
FIG. 2 shows a schematic of a diesel engine system in accordance with an embodiment of the disclosure.

With reference to FIG. 2, in accordance with a first embodiment the off-highway vehicle 10 includes an engine system 40 configured to deliver power to the vehicle 10 to move the machine via its tracks 16 and to power a pump to supply hydraulic fluid to the actuators 32, 34, 36 to move the arm 18 and perform working operations. The system includes a diesel internal combustion engine 42, which is arranged to provide power to the tracks 16 via a suitable transmission and driveline (not shown). The engine 42 is also arranged to power a hydraulic pump 44, linked to operator controls to enable the operator to selectively supply hydraulic fluid to one or more of the hydraulic rams 32, 34, 36 to manipulate the working arms and thereby perform working operations.

The engine 42 of the engine system is one physically designed and whose engine management system is programmed to minimise particulate and $NO_x$ emissions. Engines of this type are referred to as "clean combustion" engines.

An example of an engine of this type is the applicant's series of engines offered under the Dieselmax® and Ecomax® brands. These engines have capacities of 3.0, 4.4 and 4.81 in four cylinder versions and 7.21 in six cylinder versions. The engines are four stroke, have four or six cylinders, and have a range of power outputs between 55 kW and 212 kW. The engines utilise common rail fuel injection, with optimised injector nozzle characteristics to enhance fuel atomisation and therefore burn, as well as variable geometry turbochargers, all of which contribute to low engine exhaust emissions.

The engine system 40 includes an after-treatment system 46 configured to reduce emissions, e.g. $NO_x$ and particular matter, from the engine system 40. An engine exhaust pipe 43 provides a conduit for exhaust gases generated by the engine 42. Exhaust gases can pass from the engine 42 to the after-treatment system 46, via the exhaust pipe 43, before being emitted from the vehicle.

In exemplary embodiments, the after-treatment system 46 includes a downstream selective catalytic reduction (SCR) component 48 and an upstream diesel oxidation catalyst (DOC) component 50. In some embodiments, additional after-treatment components may be provided, e.g. a DPF component. In the illustrated embodiment, each after-treatment component 48, 50 is provided in line with the exhaust pipe 43.

Upstream of the SCR component 48 a fluid injection arrangement 52 is provided. This is configured to inject fluid into the engine exhaust 43 upstream of the SCR component 48. Typically, a fluid containing ammonia or urea is injected by the fluid injection arrangement 52, e.g. diesel exhaust fluid (DEF) or fluid sold under the name AdBlue®.

The engine system 40 also includes a catalytic combustor 54 positioned such that the exhaust 56 of the catalytic combustor 54 is coupled to the diesel engine exhaust 43 upstream of the after-treatment system 46. In this way, exhaust gases from the catalytic combustor 54 can directly heat the after-treatment system 46. The catalytic combustor 54 may be of the type described in WO 2007/0035649 or US 2014/0186784, for example.

In alternative embodiments, the exhaust 56 of the combustor 54 may be provided in-line with the engine exhaust 43, upstream of the after-treatment system 46.

The catalytic combustor 54 comprises a catalyst 58 for promoting combustion of a mixture of air and fuel which is passed through the catalytic combustor 54. The catalyst 58 is arranged to be heated, e.g. via electrical heating. For example, the catalyst 58 includes an electrical heating element which is powered by the battery of the engine system 40.

As will be understood by those skilled in the art, catalytic combustors typically emit very low or negligible amounts of harmful emissions. Accordingly, exhaust emissions from the catalytic combustor 54 will introduce low or negligible amounts of harmful emissions to the engine exhaust 43.

In some embodiments, the catalytic combustor 54 includes a jacket 60 (e.g. a water jacket) through which a heat transfer medium can circulate, e.g. water, air, or other suitable fluid. Combustion in the catalytic combustor 54 generates heat which can raise the temperature of the heat transfer medium in the water jacket 60. This heated heat transfer medium can be used to provide heat to other components of the vehicle. For example, the heat transfer medium can transmit heat to another component of the vehicle via any suitable heat transfer means.

In some embodiments, the catalytic combustor comprises an exhaust gas bypass, which directs exhaust gas from the combustor through a cooler. The cooler extracts heat from the exhaust gas, e.g. the cooler comprises a heat transfer medium for extracting heat from the exhaust gas, and this heat energy can be distributed to other parts of the vehicle. The cooled gas can then be fed back into the combustor. This mechanism is similar to those used in Exhaust Gas Recirculation (EGR) systems, as will be understood by those skilled in the art.

In some embodiments, waste heat from the catalytic combustor 54 can be used to supply heat to a heating system for the operator cab 15.

The engine system 40 further comprises an electrical energy storage device, e.g. a battery (not shown), configured for starting the diesel engine.

Figure 3A:
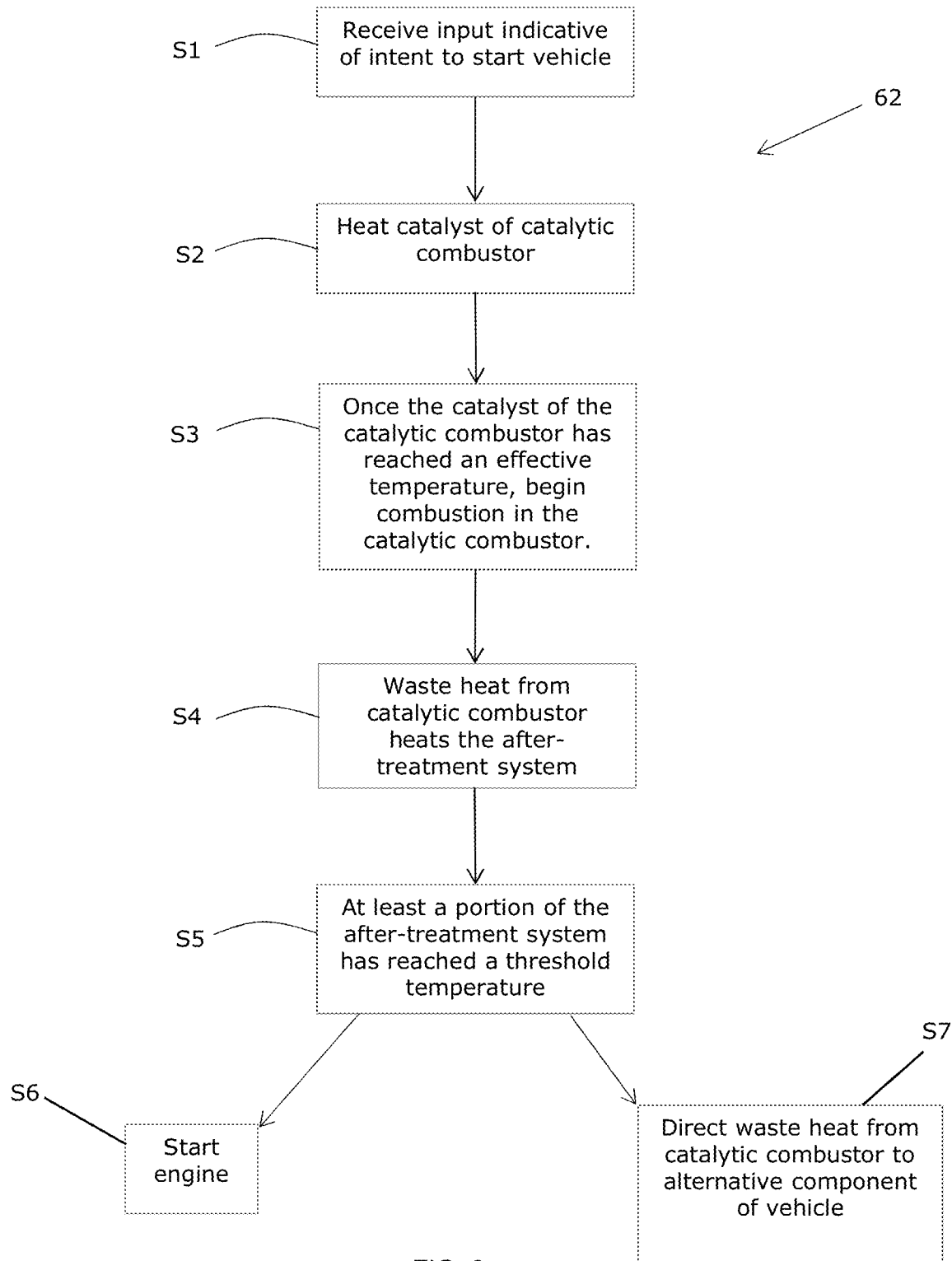
FIG. 3a illustrates a flow-chart showing the operation of an emissions abatement system of the engine system of FIG. 2.

With reference to FIG. 3a, the off highway vehicle includes an emissions abatement system 62, configured to reduce harmful emissions emitted from the vehicle. The emissions abatement system 62 includes a controller (not shown).

The controller is arranged to receive an input indicative of an intent to start the vehicle 10 (S1), e.g. a user input. This input may correspond to a user turning a key to start the engine, a user opening a door to the operator cab 15, and/or a user occupying an operator seat in the operator cab 15. Upon receipt of this input, the controller directs the battery to provide electrical energy to the heating element of the catalyst 58 of the catalytic combustor 54 (S2), thereby raising the operating temperature of the catalyst 58.

The controller is configured to determine when the catalyst 58 has reached an effective temperature. As used herein, the term "effective temperature" is understood to mean a temperature at which the relevant catalyst begins to function with a required level of efficiency. The effective temperature may depend on various factors, e.g. whether the vehicle is starting from a cold or warm start, and the ambient temperature. The required level of efficiency may correspond to a temperature lower than the optimal temperature, for example, to improve heating efficiency. For example, in relation to heating the after-treatment system 46, heating directly via the engine exhaust gases may be more energy efficient than heating via a separate electrically powered heating component. Therefore, the effective temperature may be selected to account for this.

Once the controller determines that the catalyst 58 has reached the effective temperature, the controller directs the catalytic combustor 54 to begin combustion (S3).

Waste heat generated by the catalytic combustor 54 leaves the exhaust 56 of the catalytic combustor and enters the engine exhaust 43 upstream of the after-treatment system 46. This acts to directly heat the after-treatment system 46 (S4).

The controller is configured to determine when the temperature of at least a portion of the after-treatment system has reached a threshold temperature (S5).

In exemplary embodiments, the controller may determine that a portion of the after-treatment system 46 has reached the threshold temperature when at least one of the after-treatment system components 48, 50 has reached an effective temperature. For example, when the DOC component 50 has reached an effective temperature.

In exemplary embodiments, the controller may determine that at least a portion of the after-treatment system 46 has reached the threshold temperature when at least a portion (e.g. an upstream portion) of one or more of the after-treatment system components 48, 50 has reached an effective temperature. For example, when an upstream portion of the DOC component 50 has reached an effective temperature.

In exemplary embodiments, the controller may determine that the after-treatment system 46 has reached the threshold temperature when all the after-treatment system components 48, 50 have each reached a respective effective temperature.

In one embodiment, illustrated in FIG. 3a, once the controller determines that a temperature of at least a portion of the after-treatment system has reached the threshold temperature, the controller directs the diesel engine 40 to be started (S6).

Additionally, the controller is configured to selectively direct waste heat generated by the catalytic combustor 54 to one or more other components of the vehicle 10.

In the case where the controller determines that a portion of the after-treatment system 46 has reached the threshold temperature, the controller may direct the catalytic combustor 54 to continue heating the after-treatment system 46 until substantially the entire after-treatment system 46 is up to temperature.

Once the engine 40 has been started, heat from the exhaust gases and heat from chemical reactions carried out by the after-treatment system 46 may heat the after-treatment system 46. In this case, once the controller determines that the threshold temperature of the after-treatment system 46 has been reached, the controller may direct some or all of the waste heat from the catalytic combustor 54 to one or more other components of the vehicle, for example the operator cab 15 (S7).

In some embodiments, the controller may direct continued heating of the after-treatment system 46 in order to maintain the temperature at the temperature threshold.

Figure 3B:
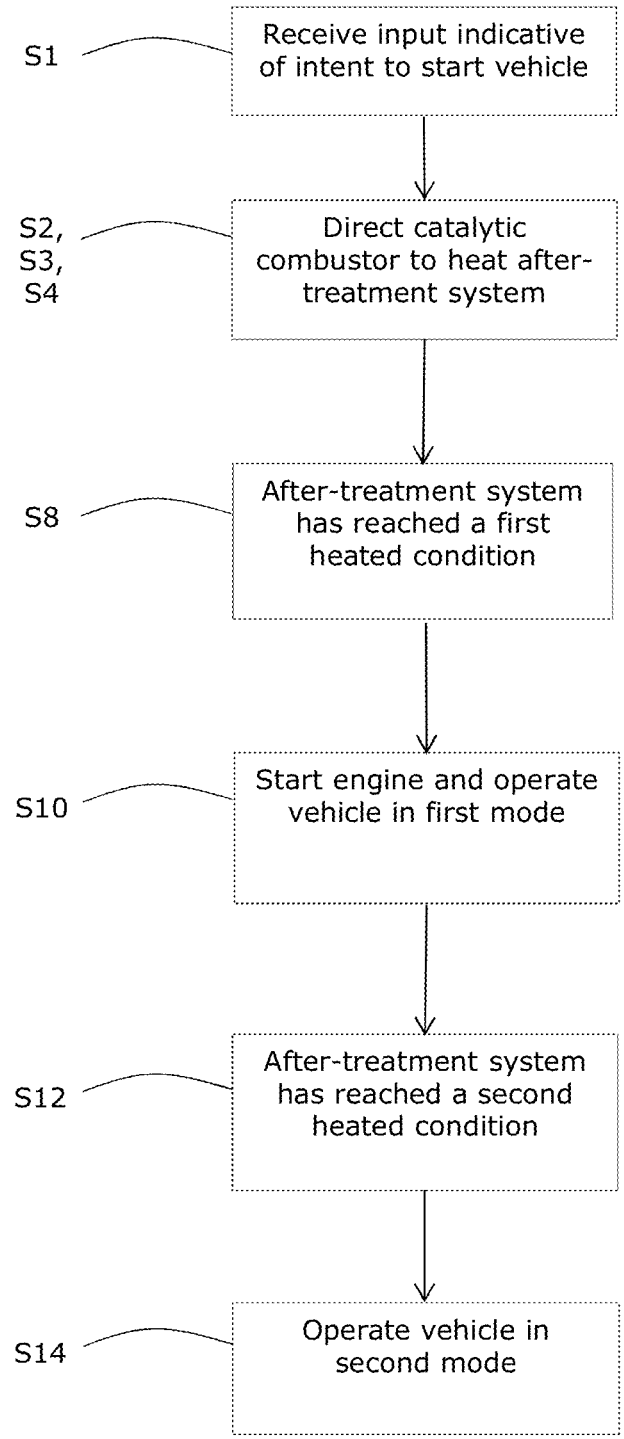
FIG. 3b illustrates a flow-chart showing the operation of an alternative emissions abatement system of the engine system of FIG. 2.

In another embodiment, illustrated in FIG. 3b, steps S1-S4 in which the catalytic combustor 54 is directed to heat the after-treatment system 46 are the same as described in relation to FIG. 3a. After step S4, the controller determines when at least a portion of the after-treatment system 46 has reached the threshold temperature. This corresponds to a first heated condition. Once the controller determines that the first heated condition has been reached (S8), the controller directs the vehicle to operate in a first mode (S10).

The controller is also configured to determine when the after-treatment system 46 has reached a second heated condition and, once this has been reached (S12), direct the vehicle 10 to operate in a second mode (S14).

In the first mode, the vehicle 10 is controlled to maintain the load on the engine 42 below a predetermined load threshold. For example, operation of the vehicle 10 may be restricted or prevented entirely, while the engine 42 is still running. In exemplary embodiments, movement of the vehicle (e.g. driving of the tracks 16) and/or actuation of the arm assembly 18 is prevented, whilst only lighting, heating and such all other peripheral operations are available. In some embodiments, slewing of the vehicle superstructure 14 may be permitted in the first mode.

In the second mode, the vehicle 10 is fully operational. In other words the available operations are not limited or restricted.

By starting the engine 42 after a portion of the after-treatment system 46 has reached the threshold temperature, said portion of the after-treatment system 46 is at a temperature at which it can treat emissions from the engine 42 to a required level of effectiveness. Restricting operations of the vehicle 10 in the first mode ensures that emissions from the engine 42 are at a level that can be effectively treated by the heated portion, accordingly keeping levels of harmful emissions from the vehicle 10 to a minimum. Further, once the engine 42 has been started, heat from the engine exhaust gases also act to raise the temperature of the after-treatment system 46, which can be more energy efficient than electrical heating.

Further, chemical reactions carried out by the portion of the after-treatment system 46 which has reached the threshold temperature also passes downstream to heat the remainder of the after-treatment system 46.

In an exemplary embodiment, in the first heated condition, a portion of the after-treatment system 46 is at or above the threshold temperature and the remainder of the after-treatment system 46 is below the threshold temperature. For example, an upstream portion of an after-treatment system component, e.g. component 50 or an upstream portion of component 50, is at the temperature threshold, and the remainder of the after-treatment system 46 is below the temperature threshold. The temperature threshold may be an effective temperature of the catalyst.

In the second heated condition, substantially the entire after-treatment system 46 is at or above the temperature threshold.

In an exemplary embodiment, the controller is configured to gradually increase the predetermined load threshold as the after-treatment system 46 progresses from the first heated condition to the second heated condition, in other words, as the entire after-treatment system 46 gets up to temperature.

In some embodiments, when the after-treatment system 46 is in the first heated condition the catalytic combustor 54 is directed by the controller to continue heating the after-treatment system 46. In some embodiments, the amount of heat energy provided by the catalytic combustor 54 to heat the after-treatment system 46 between the first and second heated conditions is less than the amount of heat energy provided by the catalytic combustor 54 to get the after-treatment system 46 up to the first heated condition.

Alternatively, once the after-treatment system 46 has reached the first heated condition, the controller directs the catalytic combustor 54 to cease heating of the after-treatment system 46. Heat energy from the catalytic combustor 54 can instead be directed to heat alternative components of the vehicle, for example the operator cab 15.

In some embodiments, the catalytic combustor 54 may instead be any suitable type of combustor (i.e. the combustor may not have a catalyst).

In exemplary embodiments, the SCR catalyst of the SCR component 48 is a Cu-Zeolite catalyst and the system is configured to raise the temperature of the catalyst to an effective temperature in the range of 250-350° C., for example 300° C. The temperature to which the catalyst is heated depends on the particular material of the catalyst used. In some embodiments, the temperature to which the catalyst is heated depends on the method by which a fluid containing ammonia or urea, e.g. diesel exhaust fluid (DEF) or fluid sold under the name AdBlue®, is injected into the exhaust.

In exemplary embodiments, the DOC catalyst of the DOC component 50 may have an effective temperature in the range of 180-350° C., for example 250° C.

In exemplary embodiments, the system is configured to heat the exhaust gases such that the gas inlet temperature to the SCR is approximately 150-250° C., e.g. 200° C.

Figure 4:
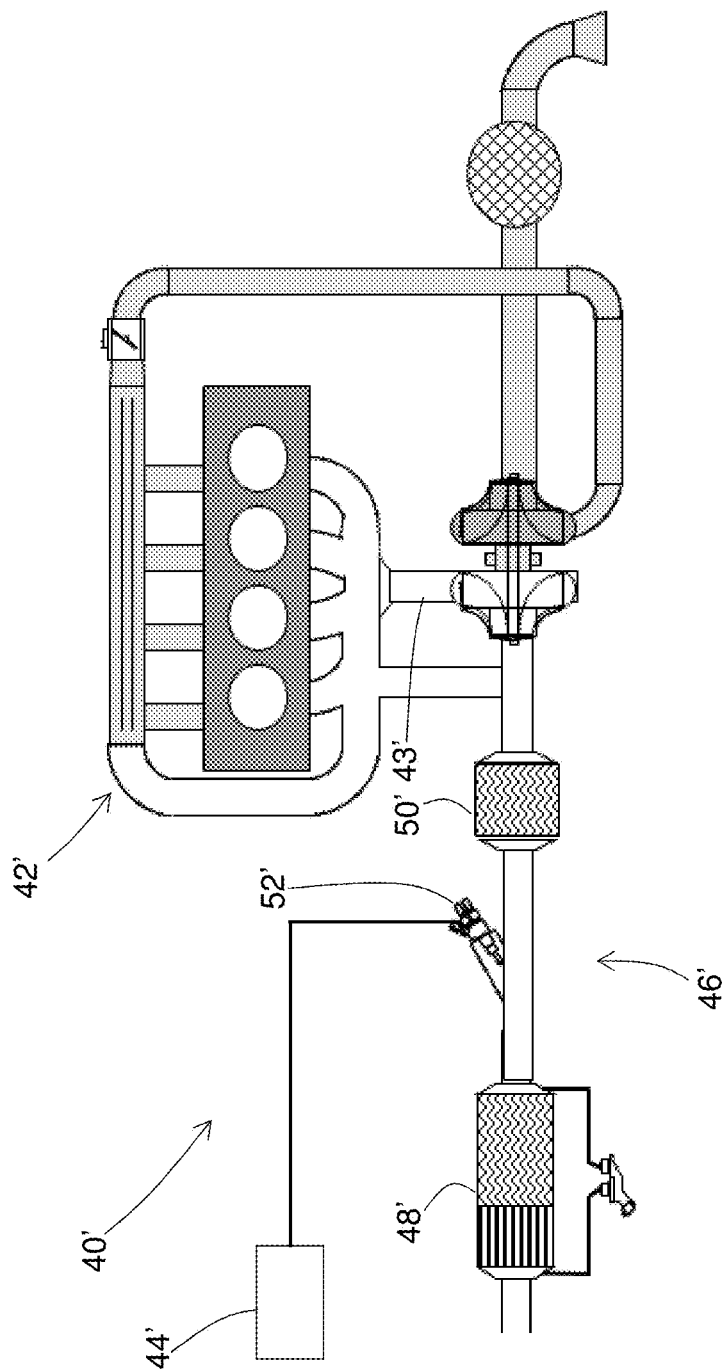
FIG. 4 shows a schematic of a diesel engine system in accordance with an alternative embodiment of the disclosure.

With reference to FIG. 4, in accordance with a second embodiment, the off highway vehicle 10 includes an engine system 40' configured to deliver power to the vehicle 10 to move the machine via the tracks 16 and to power a pump 44' to supply hydraulic fluid to the actuators 32, 34, 36 to move the arm 18 and perform working operations. The system includes a diesel engine 42', which is an internal combustion engine arranged to provide power to the tracks 16 via a suitable transmission and driveline (not shown). The engine 42' is also arranged to power the hydraulic pump 44', linked to operator controls to enable the operator to selectively supply hydraulic fluid to one or more of the hydraulic rams 32, 34, 36 to manipulate the working arms and thereby perform working operations.

The diesel engine 42' may be a similar type of engine as described in relation to the first embodiment. The engine system 40' also includes an after-treatment system 46' configured to reduce emissions from the system. An engine exhaust pipe 43' provides a conduit for exhaust gases generated by the engine 42'. Exhaust gases can pass from the engine 42' to the after-treatment system 46', via the exhaust pipe 43', before being emitted from the vehicle.

Figure 4A:
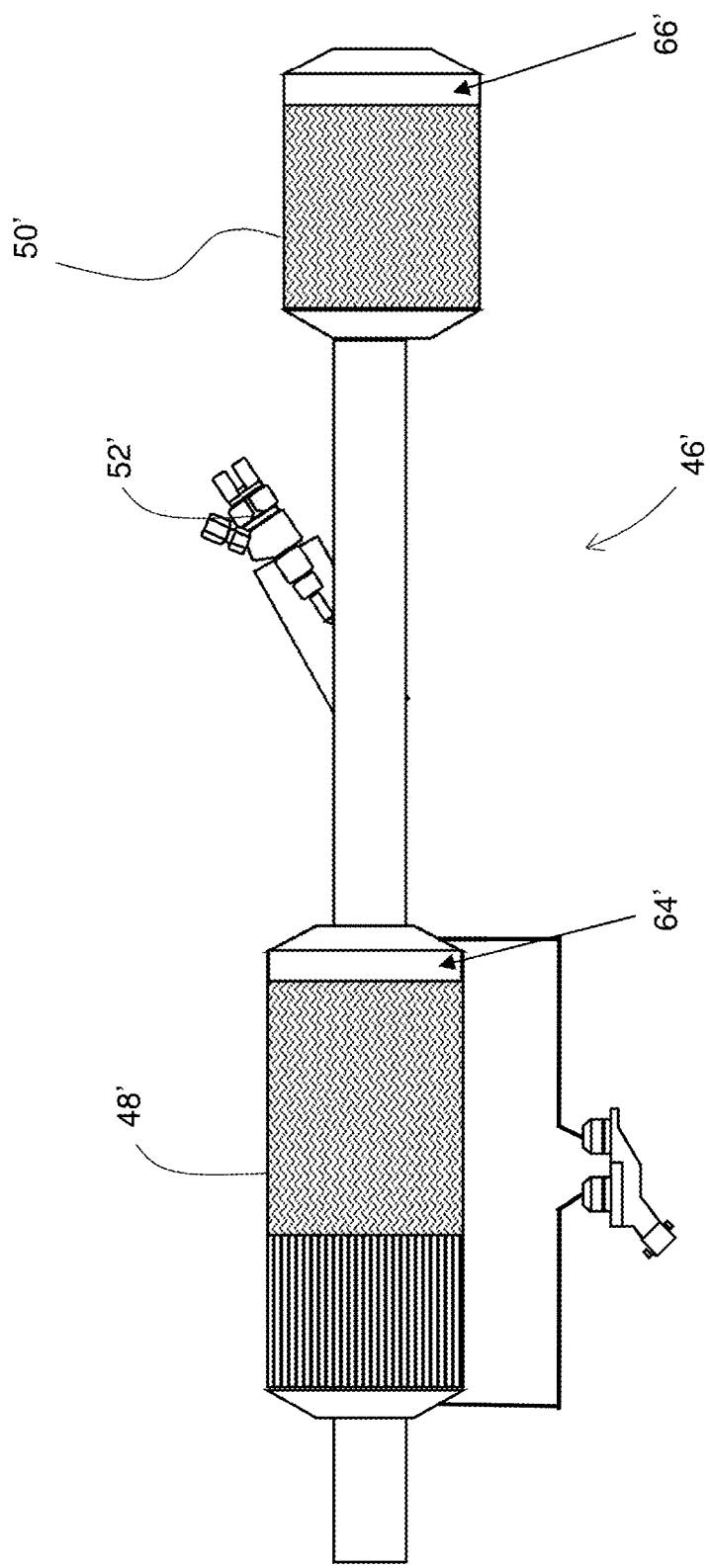
FIG. 4a shows an enlarged section of the after-treatment system of FIG. 4.

In exemplary embodiments, the after-treatment system 46' includes a selective catalytic reduction (SCR) component 48' and a diesel oxidation catalyst (DOC) component 50', as shown in detail in FIG. 4*a*. In some embodiments, additional after-treatment components may be provided, e.g. a DPF component. In the illustrated embodiment, each after-treatment component 48', 50' is provided in line with the exhaust pipe 43'.

A fluid injection component 52' is provided upstream of the SCR component 48', in a similar manner as described in relation to the first embodiment.

With reference to FIG. 4*a*, the SCR component 48' includes a heated portion 64'. Similarly, the DOC component 50' includes a heated portion 66'. Each of the heated portions 64', 66' comprise a heating element configured to directly heat the respective after-treatment component. The heating elements are configured to be electrically heated and powered by the engine battery. It will be appreciated that the engine battery is also configured to start the diesel engine. In some embodiments, the heated portions 64', 66' are heated by induction heating.

As can be seen from FIGS. 4 and 4*a*, the heated portions 64', 66' are located at an upstream portion of the respective after-treatment component 48', 50'. Accordingly, heat generated by chemical processes at the heated portions 64', 66' will pass downstream to heat the remainder of the respective after-treatment component 48', 50'.

Each of the SCR 48' and DOC 50' components include a substrate coated with a suitable catalytic material. In the heated portions 64', 66' of the components 48', 50' the substrate may include a heating element or may itself be the heating element. Each substrate may be coated with catalytic material via any suitable means.

The heated portion 64', 66' of the each substrate comprises in the range of 5-35% of the substrate length, e.g. 5, 10, 15, 20, 25, 30 or 35%. In some embodiments, the heated portion of the each substrate comprises more than 35% of the substrate length.

Figure 5:
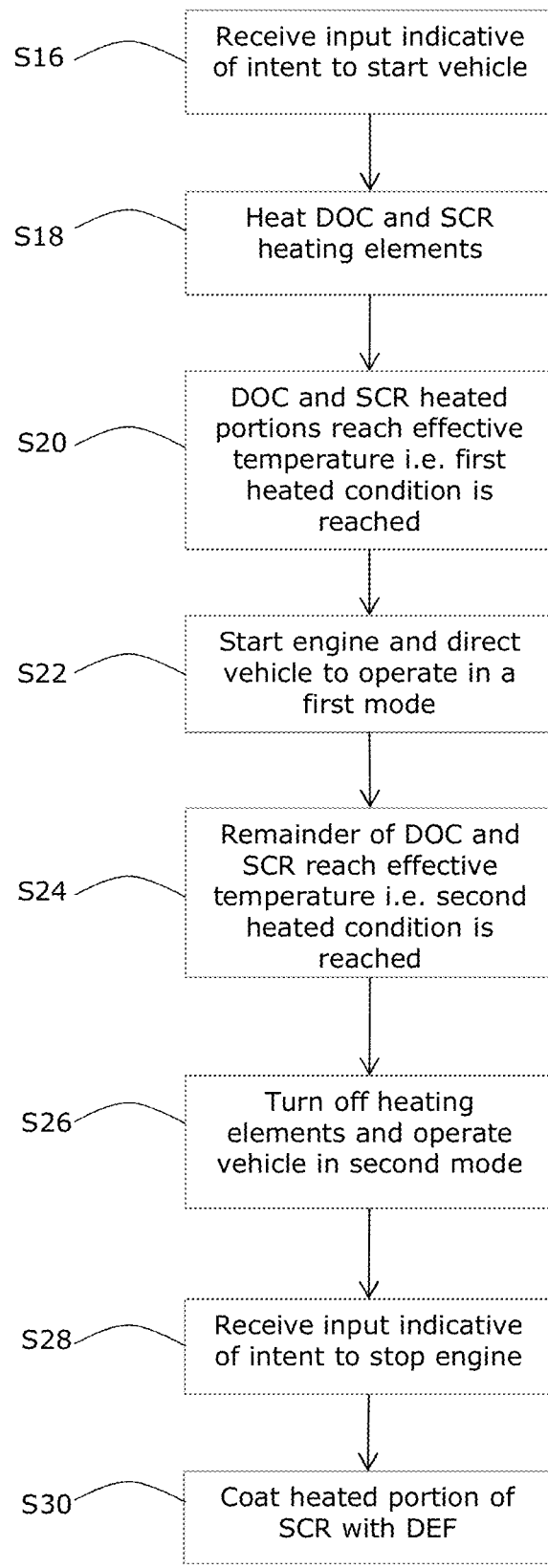
FIG. 5 illustrates a flow-chart showing the operation of an emissions abatement system of the engine system of FIG. 4.

With reference to FIG. 5, the diesel engine system 40' includes an emissions abatement system comprising a controller. The controller is arranged to receive an input indicative of an intent to start the vehicle S16, as described in relation to FIG. 3*a*. Upon receiving this input, the controller is configured to activate the heating elements in the SCR and DOC components 48', 50' to raise the operating temperature of the respective heated portions 64', 66' (S18).

The SCR and DOC heated portions 64', 66' are heated until they reach a threshold temperature (S20) e.g. a respective effective temperature. This corresponds to a first heated condition of the after-treatment system 46'. In exemplary embodiments, the controller may determine that the SCR and DOC heated portions 64', 66' have reached the threshold temperature when both portions have reached a respective effective temperature.

In some embodiments, the controller may determine that the SCR and DOC heated portions 64', 66' have reached the threshold temperature when at least one of the heated portions 64', 66' has reached an effective temperature.

In the embodiment illustrated in FIG. 5, once the first heated condition has been reached S20, the controller is configured to direct the diesel engine 42' to start and to direct the vehicle to operate in a first mode (S22). In this mode, the vehicle is controlled to maintain the load on the engine 42' below a low load threshold load, as described in relation to the embodiment illustrated in FIG. 3*b*.

Heat from the diesel engine 42' exhaust gases and heat from chemical processes carried out at the heated portions 64', 66' acts to raise the temperature of the remainder of the SCR and DOC component substrates.

The controller is configured such that, when the vehicle 10 is operating under low load conditions i.e. in the first mode, the controller can direct the heating elements of the heated portions 64', 66' to heat the respective portions 64', 66' and maintain the operating temperature of the after-treatment system 46' at an effective temperature.

Alternatively, the controller may direct these heated elements to cease heating the heated portions 64', 66', instead relying on exhaust heat from the diesel engine and the chemical processes being carried out at the heated portions 64', 66' to raise the operating temperature of the remainder of the SCR and DOC component substrates. In some embodiments, a controller is configured to direct the battery of the engine system to supply a reduced amount of energy to the heating elements of the heated portion 64', 66', as required to maintain these portions at their effective temperatures. In some embodiments, once the first heated condition has been reached, the controller is configured to provide a reduced amount of heat energy to heat the remainder of the SCR and DOC component substrates.

After a period of time has elapsed, the entirety of each of the DOC and SCR component substrates will reach the threshold temperature, e.g. their respective effective temperatures (S18). In other words, both the SCR and DOC components 48', 50' will have reached their effective temperatures. This corresponds to a second heated condition. At this point, the controller is configured to direct the vehicle 10 to operate in a normal mode, in which the vehicle is not controlled to maintain the load below the low load threshold (S20). Also at this time, the controller can direct the heating element of the heated portions 64', 66' to stop heating these portions.

The controller is configured to receive an input indicative of an intent to stop the engine 42' (S28). For example, a user input e.g. turning a key in the vehicle.

Upon receipt of this input, prior to engine shutdown, the controller is configured to direct the system to inject fluid into the exhaust 43' from the fluid injection apparatus 52'. The fluid comprises ammonia, urea, or other suitable reductant e.g. DEF or AdBlue®, and is injected upstream of the SCR component 48'. This coats the heated portion 64' of the SCR catalyst 48' in the injected fluid (S30) such that the catalyst is already coated in the fluid prior to a subsequent engine start-up. This avoids the need to inject this fluid into the exhaust 43' during a subsequent warm-up phase of the heated portions 64', 66' of the after-treatment system, and so avoids any cooling effect associated with this.

In some embodiments, the engine system comprises both a catalytic combustor 54 and heated portions 64', 66'.

Although the disclosure has been described above with reference to one or more embodiments, it will be appreciated that various changes or modifications may be made without departing from the scope of the invention as defined in the appended claims.

For example, the emissions abatement system has been disclosed in relation to an off-highway vehicle, however the system can be used with any suitable diesel engine system.

The invention claimed is:

1. An emissions abatement system for an engine system having an engine and an after-treatment system, the emissions abatement system being configured for operation in an off-highway vehicle and comprising:
   a controller, the controller arranged to:
   receive an input indicative of an intent to start the vehicle, upon receipt of said input, activate a heating component to raise an operating temperature of at least a portion of the after-treatment system, determine when the after-treatment system has reached a first heated condition, once the first heated condition has been reached, direct the engine to be started and direct the vehicle to operate in a first mode;

determine when the after-treatment system has reached a second heated condition, and once the second heated condition has been reached, direct the vehicle to operate in a second mode;

wherein, in the first heated condition, a first predetermined portion of the after-treatment system is at or above a first predetermined temperature and a second predetermined portion of the after-treatment system is below a second predetermined temperature, and wherein the controller is configured to determine when the after-treatment system is in a cold condition, in which both the first and second predetermined portions are below the respective predetermined temperatures, and the controller is further configured such that, when the controller determines that the after-treatment system is in a cold condition, the controller directs the heating component to apply a first amount of energy to raise the operating temperature of the after-treatment system, and when the controller determines that the after-treatment system is in the first heated condition, the controller directs the heating component to apply a second amount of energy to raise the operating temperature of the after-treatment system.

2. The emissions abatement system according to claim 1, wherein in the first mode, the vehicle is controlled to maintain the load on the engine below a predetermined load threshold.

3. The emissions abatement system according to claim 2, wherein, in the second mode, vehicle operations are not controlled to maintain the load on the engine below the predetermined load threshold.

4. The emissions abatement system according to claim 1, wherein, in the second heated condition, the first predetermined portion is at or above the first predetermined temperature and the second predetermined portion is at or above the second predetermined temperature.

5. The emissions abatement system according to claim 4, wherein the controller is configured such that, when the controller determines that the after-treatment system is in the second heated condition, the controller directs the heating component to stop heating the after-treatment system.

6. The emissions abatement system according to claim 4, wherein the first predetermined portion is upstream of the second predetermined portion.

7. The emissions abatement system according to claim 6, wherein the first predetermined portion comprises an upstream portion of an after-treatment component, and the second portion comprises the remainder of the same after-treatment component.

8. The emissions abatement system according to claim 7, wherein the heating component comprises a heating element configured to heat the first predetermined portion.

9. The emissions abatement system according to claim 1, wherein the after-treatment system comprises a DOC component upstream of an SCR component.

10. The emissions abatement system according to claim 1, wherein the heating component comprises a combustor arranged such that exhaust gases from the combustor provide heat energy to the after-treatment system.

11. The emissions abatement system according to claim 1, wherein the second amount of energy applied when the controller determines that the after-treatment system is in the first heated condition is a reduced and non-zero amount of energy compared to the first amount of energy applied when the controller determines that the after-treatment system is in a cold condition.

12. An emissions abatement system for an engine system having an engine and an after-treatment system, the emissions abatement system being configured for operation in an off-highway vehicle and comprising:

a controller, the controller arranged to:

receive an input indicative of an intent to start a vehicle, upon receipt of said input activate a heating component to raise an operating temperature of at least a portion of the after-treatment system, determine when a temperature of at least a portion of the after-treatment system has reached a threshold temperature, once the threshold temperature has been reached, directing the engine be started;

wherein the heating component comprises a combustor arranged such that exhaust gases from the combustor provide heat energy to raise the temperature of the after-treatment system, and wherein the combustor is a catalytic combustor.

13. The emissions abatement system according to claim 12, wherein the combustor exhaust is provided in-line with an engine exhaust and upstream of the after-treatment system, or wherein the combustor exhaust is coupled to the engine exhaust upstream of the after-treatment system.

14. The emissions abatement system according to claim 12, wherein activation of the catalytic combustor comprises:

heating a catalyst of the catalytic combustor, and once the catalyst reaches a predetermined temperature, begin combustion in the catalytic combustor.

15. The emissions abatement system according to claim 12, wherein the combustor is configured to heat at least one other component of the vehicle, e.g. an operator cab and/or the engine; optionally wherein the combustor comprises a heat transfer medium, e.g. water jacket, to direct heat generated by the combustor to the at least one other component; optionally wherein the controller is configured to selectively direct heat generated by the combustor to the after-treatment system and/or one or more of the at least one other component.

16. The emissions abatement system according to claim 12, wherein the engine system comprises an electrical energy storage device for starting the engine, and wherein activating the heating component comprises the controller directing the electrical energy storage device to provide electrical energy to the heating component.

17. The emissions abatement system according to claim 12, wherein the controller is configured such that, when the vehicle is operating under low load conditions, the controller directs the heating component to raise the operating temperature of the after-treatment system.

* * * * *